United States

Woodruff

[11] 3,740,201
[45] June 19, 1973

[54] POLYOLEFIN EMULSIONS CONTAINING N,N-DIMETHYLSULFENYL DITHIOCARBAMATES

[75] Inventor: Gene N. Woodruff, Bartlesville, Okla.

[73] Assignee: Phillips Petroleum Company

[22] Filed: Apr. 30, 1971

[21] Appl. No.: 139,242

Related U.S. Application Data

[63] Continuation-in-part of Ser. No. 760,706, Sept. 18, 1968, Pat. No. 3,615,798.

[52] U.S. Cl....... 260/29.7 M, 106/15 AF, 106/271, 106/272, 260/29.7 SO, 260/29.7 EM, 424/27, 424/30, 424/325
[51] Int. Cl. ........................... C08d 7/00, C09d 5/02
[58] Field of Search .................. 106/15 AF, 272; 260/28, 28.5 R, 29.6 MM, 29.6 MQ, 29.6 MN, 28.5 A, 29.7 M, 29.7 SQ, 29.7 NQ, 29.7 SE, 29.7 EM; 424/27, 30, 325

[56] References Cited
UNITED STATES PATENTS

| | | | |
|---|---|---|---|
| 2,862,850 | 12/1958 | Goodhue | 167/46 |
| 3,351,495 | 11/1967 | Larsen et al. | 136/146 |
| 3,426,133 | 2/1969 | Shotton | 424/30 X |
| 3,429,841 | 2/1969 | Pollock et al. | 106/271 X |
| 3,579,461 | 5/1971 | Glaub | 106/271 X |

*Primary Examiner*—Joan B. Evans
*Attorney*—Young & Quigg

[57] ABSTRACT

Stable oil-in-water emulsions of N,N-dimethyl alkyl-sulfenyl dithiocarbamates rodent repellents with polyolefins are prepared using emulsifying agents selected from amphoteric, nonionic, cationic, and anionic emulsifiers, which emulsions can be readily applied to surfaces to render same rodent and roach repellent. If desired, the polyolefin emulsions can be blended with asphalt and asphalt emulsions prior to application to a substrate.

6 Claims, No Drawings

POLYOLEFIN EMULSIONS CONTAINING N,N-DIMETHYLSULFENYL DITHIOCARBAMATES

BACKGROUND OF THE INVENTION

This application is a continuation-in-part application of copending Ser. No. 760,706, filed Sept. 18, 1968, entitled "Asphalt Emulsions," now U.S. Pat. No. 3,615,798.

The present invention relates to coating compositions and to their preparation. In accordance with another aspect, this invention relates to stable oil-in-water polyolefin emulsions containing rodent and roach repellents. In accordance with a further aspect, this invention relates to stable oil-in-water emulsions of N,N-dimethyl alkylsulfenyl dithiocarbamates with a polyolefin prepared with at least one amphoteric, nonionic, cationic, or anionic emulsifying agent. In accordance with a still further aspect, this invention relates to a fabric prepared from fibers of a polyolefin coated with an oil-in-water polyolefin emulsion of the invention. In accordance with another aspect, this invention relates to stable oil-in-water polyolefin emulsions containing a rodent and roach repellent and asphalt.

The problem of attack of growing trees and other nursery stock, as well as certain plants, by rodents, particularly rabbits, has become serious in many localities. In many instances the problem is also serious in buildings which are used for storage of various grain products. Any material which has a repellent action toward rodents, including rabbits, rats, etc., and which can be readily applied to surfaces to be protected would be highly useful and advantageous when applied to objects which are subject to attack by rodents.

In accordance with the invention, polyolefin emulsions containing a rodent and roach repellent are provided, which emulsions are readily applied to surfaces for rodent and roach proofing various facilities utilizing these surfaces treated with emulsions of the invention.

Accordingly, an object of this invention is to provide stable oil-in-water polyolefin emulsions.

Another object of this invention is to provide stable oil-in-water emulsions of polyethylene containing rodent repellent.

A further object of this invention is to provide a cloth or mat of fibers of polyolefin coated with polyolefinic emulsions.

A still further object of this invention is to provide oil-in-water asphalt-polyolefin emulsion blends.

A further object of this invention is to provide stable polyolefin emulsions containing rodent repellent in the form of an emulsion of rodent repellant and asphalt.

Other aspects, objects and the several advantages of this invention will be readily apparent to those skilled in the art upon reference to the following description and appended claims.

SUMMARY OF THE INVENTION

According to the invention, blends of at least one N,N-dimethyl alkylsulfenyl dithiocarbamate and an oil-in-water polyolefin emulsion comprising polyolefin, water and selected emulsifying agents are provided.

The polyolefin emulsions can be amphoteric, anionic, cationic, or nonionic and can be prepared by any method suitable and known to those skilled in the art.

Further, in accordance with the invention, it has been found that polyolefins, particularly polymers of mono-1-olefins having from two to eight carbon atoms per molecule, preferably polymers of ethylene or propylene, including both homopolymers and copolymers, after heating with rodent and roach repellent, can be emulsified with at least one of said emulsifying agents. The resulting composition of dithiocarbamate and polyolefin can be applied to surfaces for protecting same against attack by rodents and roaches.

In accordance with one embodiment of the invention, a cloth which is impervious to water is prepared from the fibers of a polyolefin and is coated or impregnated with oil-in-water emulsions prepared from a polyolefin, water, and selected emulsifying agents and an N,N-dimethyl alkylsulfenyl dithiocarbamate, a rodent and roach repellent.

In accordance with a further embodiment of the invention, stable oil-in-water emulsions comprising (a) an N,N-dimethyl alkylsulfenyl dithiocarbamate; (b) polyolefin and at least one emulsifying agent selected from (1) amphoteric, (2) nonionic, (3) anionic, and (4) cationic emulsifying agents are prepared, which emulsions can be applied to surfaces desired to be rendered rodent and roach repellent.

It has also been found, as set forth in said copending application, that the polyolefin emulsions can be blended with an asphalt emulsion before applying to a substrate.

In accordance with an embodiment of the invention as set forth in said copending application, the N,N-dimethyl alkylsulfenyl dithiocarbamate is incorporated into the asphalt emulsion by emulsifying the dithiocarbamate with a polyolefin prior to blending with the asphalt emulsion. The resulting emulsions are excellent rodent repellent compositions.

DESCRIPTION OF PREFERRED EMBODIMENTS

In accordance with the invention, it has been found that stable emulsions of polyolefins, particularly polymers of mono-1-olefins having from two to eight carbon atoms per molecule, preferably polymers of ethylene or propylene, including both homopolymers and copolymers, can be prepared with certain dithiocarbamates such as herein described. Polyolefins presently preferred are polyethylenes having molecular weights less than 100,000 and a melt index of at least about 90.

It has been further found that the dithiocarbamates described herein can be effectively incorporated into an asphalt emulsion by first emulsifying the dithiocarbamate with a polyolefin such as polyethylene and/or polypropylene. The amount of polyolefin emulsion blended with asphalt emulsion will generally be up to about 20 weight percent of total blend, preferably in the range 1–10 weight percent in the total blend. The resulting compositions containing dithiocarbamate and polyolefin and, optionally, asphalt have been found to be excellent rodent repellent compositions which can be readily applied to surfaces for protecting same against attack by rodents.

Specific N,N-dimethyl alkylsulfenyl dithiocarbamate compounds applicable to the present invention are N,N-dimethyl-S-methylsulfenyl dithiocarbamate and N,N-dimethyl-S-tert-butylsulfenyl dithiocarbamate.

The dithiocarbamate compounds of the invention can be prepared by any convenient method. One method for the preparation of said compounds comprises reacting an alkali metal salt of an N-substituted dithiocarbamate with an aliphatic sulfenyl thiocyanate. Further details regarding preparation of the dithiocarbamate compounds can be found in U.S. Pat. No. 2,390,713 and U.S. Pat. No. 2,862,850.

The amount of dithiocarbamate present in the emulsions of the invention set forth in more detail hereinbelow range from 0.5 weight percent to 20 weight percent, preferably 1 to 10 weight percent.

The amount of polyolefin present in the emulsions of the invention can vary appreciably, but will generally be in the range of 1 to 20 weight percent, but for some emulsions, the amount of polyolefin can range up to 25 weight percent or higher. The amount of emulsifier present can range from 0.1 to about 5 weight percent, but in some instances can be as much as 10 weight percent or more, if desired. The balance of the emulsion comprises water which will ordinarily amount to 80 to 99 weight percent based on the total blend.

As indicated above, the emulsions of the invention are particularly effective as coating or impregnating compositions to be utilized in places where it is desired to protect surfaces against attack by rodents. However, if desired, the compositions of the invention can be used for other applications, including water-proofing material for roofs and the like, for covering spaced-in-surfaces in irrigation canals, ponds, open dams, and the like, and for related uses. The impregnated cloth or matting can be used for either temporary or permanent roofing, for mulching, for tenting material, and for related uses.

In accordance with a further embodiment of the invention, the polyolefin emulsions or blends of asphalt and polyolefin emulsions can be applied to a cloth or mat made from fibers, for example, fibers formed from synthetic thermoplastics, such as polypropylene fabric, that have been previously woven or matted into a cloth or structure resembling same to form a water-proof structure. The water in the emulsion can be removed by any suitable method such as air drying or drying in an oven or by other heat.

It is also within the scope of the invention to add short fiber asbestos and similar materials to the emulsions of the invention. The addition of short fiber asbestos, for example, to the emulsions of the invention increases the usefulness of the emulsions, increases the viscosity and permits application of the emulsions to surfaces where improved adhesion is necessary. The ring and ball properties of the dried product when asphalt is present is greatly increased by the addition of asbestos. The amount of asbestos added can be varied depending on the resulting desired characteristics, but in general will be in the range of 1 to 10 weight percent. The asbestos fibers are finely divided and ordinarily 0.1mm to 2.0mm in length.

The asphalts that can be used in the preparation of the emulsions that can be blended with the polyolefin emulsions include any of those bituminous materials used heretofore and known in the prior art such as natural asphalts or those derived from petroleum refining, for example, by steam refining and/or air blowing, and the like. Asphalts characterized by penetrations (ASTM D–5–51) from 0 to about 300, or even higher, and preferably from about 40 to 300, and having softening points (ASTM D–36–26) in the range of 90° to 250° F, and preferably 100° to 150° F, represent suitable asphalts that can be employed.

The relative amounts of the various components of the asphalt emulsions which can be blended with the polyolefin emulsions can vary, but in general the asphalt is present in an amount in the range of 50 to 90, preferably 60 to 85 weight percent; the emulsifier is present in an amount in the range of 0.1 to 4, preferably 0.25 to 1; and water is present in an amount between 50 and 10 weight percent based on the total blend.

The asphalt emulsions employed can be prepared by any method known to those skilled in the art, for example, by preparing a soap solution comprising water, either soft or hard, and an emulsifying agent, either amphoteric, anionic or nonionic. The soap solution is then mixed in a colloid mill or the like with the asphalt phase, the latter being preferably heated to reduce the viscosity. Usually, the emulsifiers and any modifiers or promoters are dispersed in the water to form a soap solution which is then warmed to a temperature of 90° to 200° F, preferably 90° to 125° F. The asphalt can be heated to a temperature in the range of 150° to 350° F, preferably 250° F to 300° F. The warm soap solution and hot asphalt are then proportioned to a colloid mill to emulsify the mixture, during which milling the temperature of the mixture can be in the range of 100° to 210° F, preferably 150° to 200° F. The completed emulsion is then cooled to a temperature below 150° F before being used or transferred to storage. The method of preparing an emulsion will have some effect on the properties thereof and the intended application or utility of the emulsion will dictate which particular method one should use to get the desired properties.

The asphalts described above can be emulsified as set forth in said copending application with amphoteric, nonionic, and anionic emulsifying agents.

As indicated previously, the emulsifying agents employed to prepare the polyolefin emulsions of the invention can be amphoteric, anionic, cationic, or nonionic, or combinations thereof.

One useful emulsifying system is oleic acid and triethanol amine.

Amphoteric emulsifying agents that can be used include the betaine derivatives such as coco betaine (Culveram CDG) and cetyl betaine (BCO), as well as other coco- and tallow-derived glycinecompounds, stearyl ammonium sulfonic acid betain, myristyl ammonium sulfonic acid betain, polyoxyethylated amine derivatives, and the like.

Emulsifying agents containing both amino and carbonyl groups can be used such as those emulsifying agents having the formula

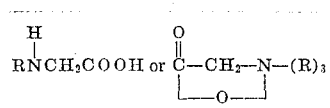

wherein R is an aliphatic hydrocarbon radical containing four to 25 carbon atoms.

Nonionic emulsifying agents which are effective are those containing 20 to 60 ethylene oxide groups, for example, Triton X–100, Triton X–305, and Triton X–405.

Anionic emulsifying agents which are effective include Vinsol resin, with or without Indulin C, as well as sodium salts of stearic acid, oleic acid, linoleic acid, saturated acids, tall oil derived anionic emulsifiers, and the like.

One preferred procedure for obtaining a cationic emulsion is to employ an acid with suitable emulsifying agents to form an emulsion having an acid pH below 7. In preparing the cationic polyolefin emulsion, an emulsifying agent from the classes of nonionic or amphoteric is added to an aqueous polyolefin mixture and an acid, such as hydrochloric acid, sulfuric acid, acetic acid, or sulfamic acid, can be incorporated into the mixture to impart an acid pH below 7 to the emulsion. Generally, pH's in the range of 1 to about 10, preferably 2 to 4, are suitable for these acidic emulsions. The amount of the acid will generally be 0.1 to 1.5, preferably 0.3 to 0.8 weight percent of the emulsion, but can be considered and calculated as part of the emulsifying agents.

Cationic emulsifiers are also effective for producing stable oil-in-water emulsions according to the invention.

Additional suitable nonionic emulsification agents include those of the general formula:

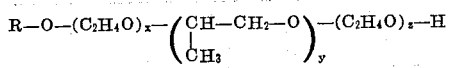

where R is selected from the group consisting of hydrogen, aryl, and alkylaryl radicals; and $x$, $y$ and $z$ are integers, such that (1) when $x$ is 0, $y$ is also 0, $z$ is in the range of 6 to 11, inclusive, and said R is one of said aryl and alkylaryl radicals, and (2) when $x$ and $y$ are each greater than 0, the sum of $x$ and $z$ is in the range of 20 to 40, inclusive, and $y$ is in the range of 40 to 60, inclusive.

Representative examples of the nonionic emulsifying agents include: phenoxypenta(ethyleneoxy)ethanol, phenoxyocta(ethyleneoxy)ethanol, phenoxyennea(ethyleneoxy)ethanol, phenoxydeca(ethyleneoxy)ethanol, 4-methylphenoxypenta-(ethyleneoxy)ethanol, 2,3,6-triethylphenoxyhepta(ethyleneoxy)ethanol, 4(1,1,3,3-tetramethylbutyl)phenoxyhepta(ethyleneoxy)ethanol, 4(1,3,5-trimethylhexyl)phenoxyhexa(ethyleneoxy)ethanol, 4-nonylphenoxyhepta(ethyleneoxy)-ethanol, 2,3,4,5,6-penta-n-pentylphenoxyennea(ethyleneoxy)ethanol, 2(1,3,5-trimethylhexyl)-4(1,3-dimethylbutyl)phenoxypenta(ethyleneoxy)ethanol, 4(3,5,5-trimethylheptyl)phenoxyhexa(ethyleneoxy)ethanol, 3(3,5,7,7-trimethyl-trimethyl-5-ethylnonyl)phenoxyhepta(ethyleneoxy)ethanol, 4(1,1,3,3,5,5,7,7-octamethyldecyl)phenoxyennea(ethyleneoxy)ethanol, 4-n-pentacosylphenoxypenta(ethyleneoxy)ethanol, 3,5-di-n-decyl-4-n-pentylphenoxydeca(ethyleneoxy)ethanol, beta-hydroxyethyleneoxytetraconta(propyleneoxy)octadeca(ethyleneoxy)ethanol, beta-hydroxymethoxyoctadeca(ethyleneoxy)tetracontra(propyleneoxy)ethanol, beta-hydroxyethoxyennea(ethyleneoxy)pentaconta(propyleneoxy)deca(ethyleneoxy)-ethanol, beta-hydroxyethoxynonadeca(ethyleneoxy)hexaconta(propyleneoxy)nonadeca(ethyleneoxy)ethanol, beta-hydroxyethoxytetradeca(ethyleneoxy)pentatetracontra(propyleneoxy)tetradeca(ethyleneoxy)ethanol, phenoxyethyleneoxypentapentaconta(propyleneoxy)octatriaconta(ethyleneoxy)ethanol, 4-methylphenoxydeca(ethyleneoxy)nonatetraconta(propyleneoxy)eicosa(ethyleneoxy)-ethanol, 4(1,3,5-trimethylhexyl)phenoxyhexa(ethyleneoxy)pentacontra(propyleneoxy)triconta(ethyleneoxy)ethanol, 4-n-pentacosylphenoxypentacosa(ethyleneoxy)- pentaconta(propyleneoxy)deca(ethyleneoxy)ethanol, 2,4,5-trimethylphenoxydeca-(ethyleneoxy)pentaconta(propyleneoxy)pentacosa(ethyleneoxy)ethanol, 2(1,3,5-trimethylhexyl)-4(1,1,3,3-tetramethylbutyl)-phenoxyeicosa(ethyleneoxy)hexatetraconta(propyleneoxy)penta(ethyleneoxy)ethanol, 4-n-pentacosylphenoxyeicosa(ethyleneoxy)hexaconta(propyleneoxy)nonatriaconta(ethyleneoxy)ethanol, and the like, and mixtures thereof.

In addition, other nonionic emulsifying agents may be used including those of the general formula:

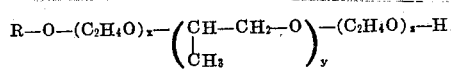

where R is selected from the group consisting of hydrogen, aryl and alkaryl radicals; and $x$, $y$, and $z$ are integers such that (1) when $x$ is 0, $y$ is also 0, $z$ is in the range of 20 to 60, and R is one of said aryl and alkaryl radicals, and (2) when $x$ and $y$ are each greater than 0, the sum of $x$ and $z$ is in the range of 50 to 350, and $y$ is in the range of 40 to 60.

The nonionic emulsifying agents, as shown by the general formula, represent a rather narrow class of compounds and they have a critical balance of hydrophobic component (the R and propyleneoxy groups) and hydrophilic component (ethyleneoxy groups) necessary to give the necessary mixing time. Within the general formula given earlier for these nonionic emulsifying agents, there are two referred subclasses that can be represented by the following general formulas:

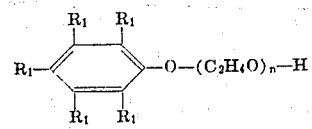

where $R_1$ is selected from the group consisting of hydrogen and alkyl radicals having one to 25 carbon atoms, the total number of carbon atoms in the alkyl radicals preferably does not exceed 25, and $n$ is an integer in the range of 20 to 60; and

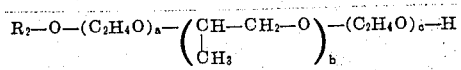

where $a$ and $c$ are integers greater than 0 and whose sum is in the range of 50 to 350, $b$ is an integer in the range of 40 to 60, and $R_2$ is selected from the group consisting of hydrogen and the hydrocarbon radical:

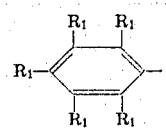

where $R_1$ is as defined above.

A particularly preferred nonionic emulsifier is Triton X-100, which is isooctyl phenyl polyethoxy ethanol, Triton X-305, which is a mixture of octaphenoxypoly(ethyleneoxy)ethanol having 30 ethyleneoxy groups in the poly-(ethyleneoxy) chain.

Suitable anionic emulsifying agents employed include the sulfonates, particularly the alkylaryl sulfonates, such as: p-dodecylbenzene sodium sulfate, n- or iso-p-octylphenoxypoly(ethyleneoxy)ethanol sodium sulfonates, sodium isopropylnaphthalene sulfonate, sodium tetrahydronaphthalene sulfonate, and methylnaphthylene sodium sulfonate (Petro Ag); and the sulfates: sodium cetyl sulfate (n-hexadecylsodium sulfate), ammonium lauryl sulfate, sodium tridecyl sulfate; and the phosphates: alkylpolyphosphates, complex amidophospho salts, as well as esters and others such as: sodium diamyl sulfosuccinate and disodium-N-octadecyl sulfosuccinamate.

EXAMPLE I

Runs were carried out in which tert-butylsulfenyldimethyl dithiocarbamate was emulsified with polyethylene and subsequently blended with an asphalt emulsion.

In one run, 7 grams of tert-butylsulfenyldimethyl dithiocarbamate, 38 grams of polyethylene, 8.6 grams oleic acid, and 6.7 grams of triethanol amine were melted together at a temperature of 270° F and were poured slowly into 302 grams of water at a temperature of 200° F with constant stirring by a dispersator at a high speed. The stable polyethylene emulsion thus formed can be used as such as rodent repellent or roach repellent. If desired, the substrate can be applied to a substrate such as polyolefin fabric. The polyethylene emulsion is colorless and will stick to solid surfaces and fabrics.

In another run, the resulting stable polyethylene emulsion was blended in an amount of 10 grams with 12 grams of an asphalt emulsion using cetyl betaine as the emulsifying agent. The resulting blend produced upon drying a product containing 2 percent tert-butylsulfenyldimethyl dithiocarbamate, 82 percent asphalt, and 11.3 percent polyethylene.

The emulsion blend produced above containing the polyethylene, asphalt and dithiocarbamate has also been found to be rodent repellent.

EXAMPLE II

Additional runs were carried out in which tert-butylsulfenyldimethyl dithiocarbamate was emulsified with polyethylene with either a nonionic or a cationic emulsifying system.

In run 1, 0.85 g NaOH and 13.9 g Triton X–100 (isooctyl phenyl polyethoxy ethanol with 9–10 oxyethylene groups) were added to 250 ml $H_2O$. A blend of 1.82 weight percent R55 (tert-butylsulfenyldimethyl dithiocarbamate) in polyethylene was prepared by melting at 265° F and 12.8 g of this plastic melt was poured slowly into the 190° F aqueous solution stirred by dispersator. A stable emulsion resulted. The compositions of the emulsions are shown in the following table.

In run 3, 2.5 ml 0.51 N HCl (containing 0.046 g anhydrous HCl) and 13.1 g Redicote E–11 (a polyoxyethylated amine derivative) were added to 250 ml $H_2O$, heated to 200° F and stirred by means of a dispersator, and 18.4 g of a melt containing 0.6 weight percent R55 in polyethylene was added at 270° F to the stirring aqueous solution. A stable emulsion resulted. The compositions of the emulsions are shown in the following table.

Runs 2, 4, 5, and 6 were similarly prepared (see quantities of components listed in Table I below).

These specific nonionic type emulsions employed in the example can contain up to about 10 weight percent polyethylene. These specific cationic type emulsions employed in the example can contain up to about 25 weight percent polyethylene.

A polyolefin fabric coated with the emulsion of run 1 of Table I and wrapped around the trunk of a young pecan tree protects the tree from rabbits.

TABLE I

EMULSIFICATION OF POLYETHYLENE CONTAINING R55 RODENT REPELLENT

| Emulsion Type | Nonionic | | | Cationic | | |
|---|---|---|---|---|---|---|
| Emulsifying Agent | Triton X-100 | | | Redicote E-11 | | |
| Run No. | 1 | 2 | 3 | 4 | 5 | 6 |
| g Emulsifier | 13.9 | 15.0 | 13.1 | 9.4 | 12.0 | 11.6 |
| g KOH or NaOH | (NaOH) 0.85 | (KOH) 0.9 | – | – | – | – |
| g Anhydrous HCl | – | – | 0.046 | 0.03 | 0.046 | 0.046 |
| g Polyethylene | 12.5 | 27.3 | 18.3 | 40.4 | 42.8 | 56.9 |
| g R55 Rodent Repellent | 0.23 | 0.165 | 0.11 | 0.75 | 0.26 | 0.34 |
| ml $H_2O$ | 250 | 250 | 250 | 250 | 250 | 250 |
| °F Melt (>100°F) | 265 | 275 | 270 | 260 | 260 | 260 |
| °F Aqueous soln. | 190 | 190 | 200 | 190 | 200 | 200 |
| Emulsion | Stable | Stable | Stable | Stable | Stable | Stable |
| % R55 in residue (by wt.) | 0.84 | 0.38 | 0.35 | 1.5 | 0.47 | 0.49 |
| % Plastic in emulsion (by wt.) | 4.5 | 9.3 | 6.5 | 13.5 | 14.0 | 18.0 |
| % Emulsifier (by wt.) | 5.3 | 5.3 | 4.7 | 3.1 | 4.0 | 3.7 | g is grams

As indicated previously, the emulsions of the invention can be applied to fabrics or cloth-like materials formed from polyolefins. Thus, the dithiocarbamate-polyethylene emulsion or dithiocarbamate-asphalt-polyethylene emulsion obtained above can be applied to, say, polypropylene cloth to prevent rodent damage in large grain storage bins in countries short of food. In some instances, it may be desirable also to add a thin layer of the dithiocarbamate-polyethylene emulsion to asphalt-polypropylene cloth bins already constructed.

Cockroaches, water bugs and other small insects tend to gather and live where moist conditions prevail. Asphalt and polyethylene emulsions containing dithiocarbamates prevent cockroaches from occupying these moist areas when the surfaces are sprayed with the dithiocarbamate emulsions. Painting or spraying the boards on the under side of the frame house discourages the presence of insects. The foundations can be made repugnant to insects by a coating of the dithiocarbamates-containing emulsions. Cracks in the foundation, in walls, between wood, or between concrete and wood can be sealed and insect growth eliminated by the dithiocarbamate emulsions. Growth of insects in storage areas of ships can be controlled by the use of dithiocarbamate emulsions at cracks and corners, on beams, between flooring and in every crack and cranny of the vessel where insects thrive. The cost of fumigation would be saved and the life of wooden timbers increased.

Painting or spraying the ground around the house prevents the passage of cockroaches and small insects such as termites. Treatment of all wood in, on or near the ground prevents termite attack on the wood. Asphalt and polyethylene emulsions containing dithiocarbamates adhere well to all solids and have a long life since the life of the dithiocarbamates is the life of the polyethylene or asphalt itself. Any particle of asphalt or polyethylene is effective because the dithiocarbamates are intimately blended with the carrier asphalt or polyethylene. At times it is desirable to prevent insect growth in a bulk area such as postholes, reservoirs, pits, and depressions. Dithiocarbamate emulsions can be used to coat sand or gravel, which, as a filler for the hole or pit, would not only prevent insect growth but would seal the entire area watertight. In such use the sand, gravel, or even dirt itself, can be pretreated, dried, and tamped in place. The life of telephone poles and posts is increased by filling the hole with pretreated sand, dirt or gravel treated by the dithiocarbamate-asphalt or polyethylene emulsions and dried. The presence of insects in bomb shelters and fallout shelters is effectively discouraged by treating corners, moist areas, beams, cracks, and storage areas with the dithiocarbamate emulsions.

It is desirable to maintain poultry houses free of cockroaches, especially in damp corners or storage areas. Treatment of the corners, cracks, foundation (and its juncture with the wooden beams) will discourage or eliminate cockroaches.

The kennels of pets and the working areas of veterinary hospitals are much freer of small insects when the corners and moist areas are treated by asphalt or polyethylene-dithiocarbamate emulsions. A thin layer of the dithiocarbamate emulsions reduces the small insects in garbage pails. Use of the emulsions in the corners of hog sheds and pig troughs helps maintain cleanliness by cutting down the cockroach population. The absence of small insects also helps to prevent disease in the animals.

Treatment of the corners and inaccessible areas of restaurants and grocery stores helps to keep the premises free of cockroaches, which is most essential where food is handled. In this case there is no danger of food contamination since the dithiocarbamate is an integral part of the plastic or asphalt.

EXAMPLE III

Asphalt emulsions containing varying amounts of repellent and polyethylene emulsions containing roach repellent, along with asphalt and polyethylene emulsions containing no repellent as control runs, were evaluated for cockroach repellency. The method of determining cockroach repellency is the corner card method. (The corner card is used to determine the potential repellency of materials treated with the indicated candidate chemical.)

The method is based upon the tendency of cockroaches to congregate in and climb on corner surfaces. The test cards at the dosages and the untreated control card are placed upright in corner position against the inside wall of a glass box containing German cockroaches (*Blattella germanica*). Food and water are placed in the center of the box, and feeding is permitted ad lib. At hourly intervals a number count is made of the cockroaches present on each of the cards, as given in Table II.

TABLE II.—COCKROACH REPELLING TEST

|  | Hours | | | | | | | | | Total count of all readings | Average count per reading | Average, expressed as percent of control |
| --- | --- | --- | --- | --- | --- | --- | --- | --- | --- | --- | --- | --- |
|  | 1 | 2 | 3 | 4 | 5 | 6 | 7 | 8 | 9 | | | |
| 5.0% R55 (dry basis) asphalt emulsion | 3 | 1 | 1 | 0 | 1 | 0 | 0 | 0 | 2 | 8 | 0.9 | 3.1 |
| 0.85% R55 (dry basis) asphalt emulsion | 8 | 4 | 3 | 3 | 3 | 3 | 3 | 6 | 6 | 39 | 4.3 | 14.8 |
| Zero R55 (Control) asphalt emulsion | 20 | 24 | 16 | 12 | 15 | 12 | 29 | 64 | 69 | 261 | 29.0 | 100.0 |
| 11.6% R55 (dry basis) polyethylene emulsion | 1 | 2 | 3 | 2 | 4 | 2 | 3 | 2 | 1 | 20 | 2.2 | 4.6 |
| Zero R55 (Control) polyethylene emulsion | 47 | 39 | 47 | 54 | 65 | 49 | 51 | 37 | 42 | 431 | 47.9 | 100.0 |

NOTE.—R55=tert-butylsulfenyldimethyl dithiocarbamate.

I claim:

1. A stable oil-in-water emulsion consisting essentially of:
   a. 0.5 to 20 weight percent of an N,N-dimethylsulfenyl dithiocarbamate compound selected from the group consisting of N,N-dimethyl-S-methylsulfenyl dithiocarbamate and N,N-dimethyl-S-tert-butylsulfonyl dithiocarbamate,
   b. 1 to 20 weight percent of a polyolefin which is a polymer of a mono-2-olefin having from two to eight carbon atoms per molecule,
   c. 0.1 to about 5 weight percent of an emulsifying agent selected from amphoteric, nonionic, anionic, and cationic agents, and
   d. the balance water.

2. A composition according to claim 1 wherein (a) is N,N-dimethyl-S-tert-butylsulfenyl dithiocarbamate and (b) is polyethylene.

3. A composition according to claim 2 wherein (c) is oleic acid and triethanolamine.

4. A composition according to claim 2 wherein (c) is isooctyl phenyl polyethoxy ethanol with 9–10 oxyethylene groups.

5. A composition according to claim 2 wherein (c) is a cationic system comprising a polyoxyethylated amine derivative and an acid.

6. A stable oil-in-water emulsion according to claim 1 wherein (C) is a cationic emulsifying system consisting essentially of the reaction product of a nonionic or amphoteric emulsifying agent and an acid, the amount of acid present being sufficient to impart a pH below 7 to the emulsion.

* * * * *